No. 862,582. PATENTED AUG. 6, 1907.
A. NEUBERT.
TROLLEY SWITCH FROG AND POLE.
APPLICATION FILED FEB. 15, 1906.
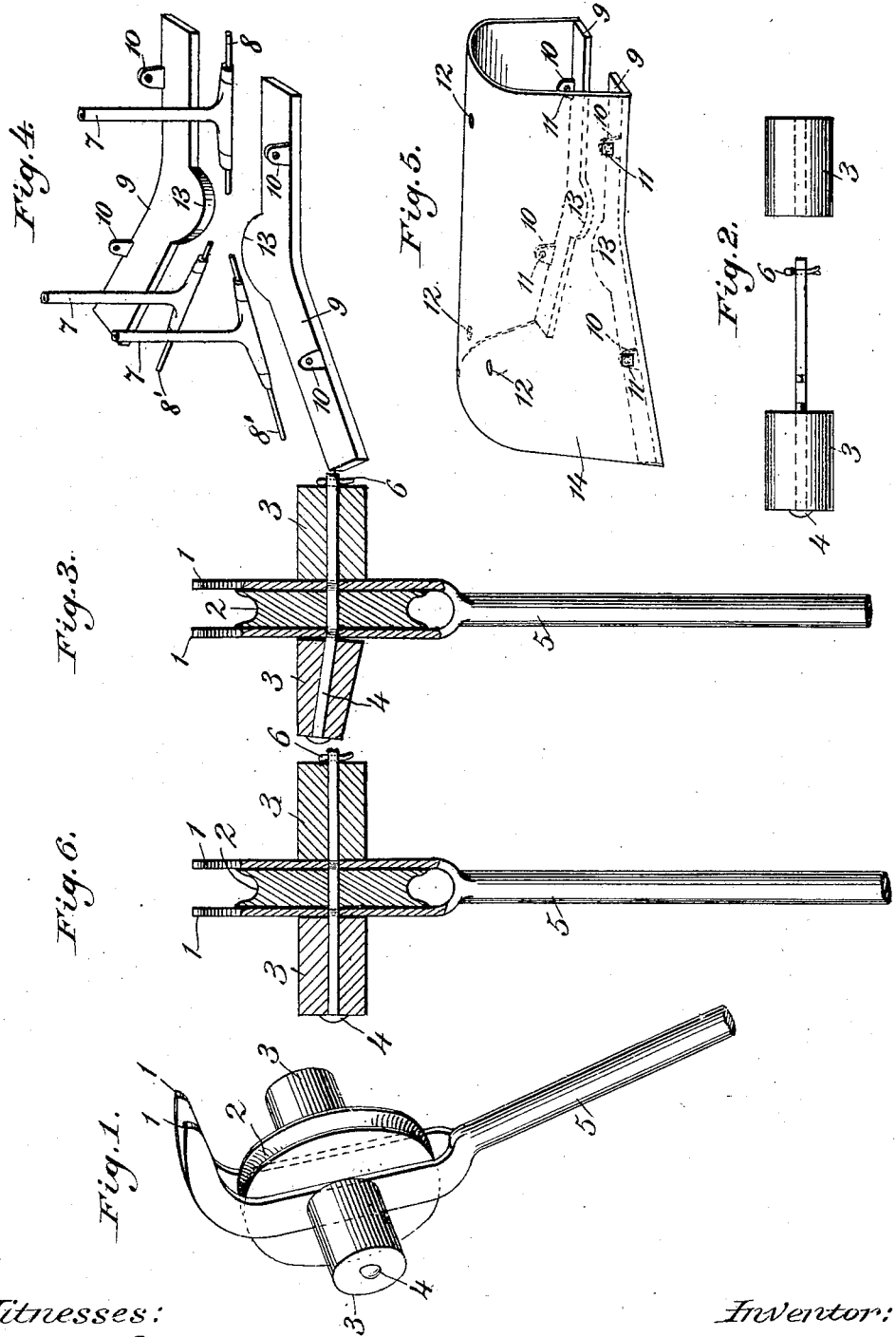

UNITED STATES PATENT OFFICE.

AUGUSTUS NEUBERT, OF ELIZABETH, NEW JERSEY.

TROLLEY SWITCH FROG AND POLE.

No. 862,582.  Specification of Letters Patent.  Patented Aug. 6, 1907.

Application filed February 15, 1906. Serial No. 301,219.

*To all whom it may concern:*

Be it known that I, AUGUSTUS NEUBERT, a citizen of the United States, residing at the city of Elizabeth, county of Union, and State of New Jersey, have invented a new and useful Improvement in Trolley Switch Frogs and Poles, of which the following is a specification.

This invention relates to an improved trolley switch frog and pole for open-space systems.

The object of the invention is to provide simple and efficient means for switching a trolley wheel from one wire to another through space, without its jumping the spaces or leaving the current wire at other points.

In the accompanying drawings, in which like reference characters indicate corresponding parts,—Figure 1 represents a perspective view of the wheel end of the trolley pole; Fig. 2 represents a side elevation of the journal pin for the trolley wheel, with one guide roller attached and with one removed and placed in position ready for assembling; Fig. 3 represents a front elevation of the trolley pole with its wheel, fork and guide rollers shown in vertical section, one roller being shown tapered with its journal pin up-bent; Fig. 4 represents a perspective view of a trolley switch and frog embodying this invention; Fig. 5 represents a perspective view of the switch frog plates with a hood-like cover forming braces therefor; and Fig. 6 represents a view similar to Fig. 2, showing both rollers of the same size.

The switch frog includes two spaced guide plates 9, of approximately V-shape, disposed with two of their arms arranged parallel to provide a straight guideway between said arms for a single trolley wire 8, and with their other arms diverging or flared outwardly to provide for the diverging wires 8'. These plates 9 are each provided with inwardly-projecting, rounded lugs 13, arranged opposite the points of intersection of the wires. These plates 9 are preferably attached by ears 10 to the opposite sides of a hood 14, having apertures 12 for the passage of the hangers 7, which support the wires.

The trolley pole 5 is provided at its free end with a fork having its tines bent forwardly substantially at right angles and the grooved trolley wheel 2 is mounted between these tines on a bolt or axle pin 4. This pin 4 projects on opposite sides of the fork and is mounted on the guide wheels, as 3, engaging with the under faces of the plates 9 to guide the trolley wheel through the spaces between the wires of the switch and onto the wire on the other side of the space without its moving out of the proper path. The upwardly-projecting, forwardly-bent ends 1 of the fork serve to hold the trolley wheel on the wire and prevent its lateral movement. The round lugs 13 serve to narrow the path of the wheel at the spaces between the wires to prevent it leaving the proper course.

I claim as my invention,—

1. A trolley switch frog composed of spaced plates arranged on opposite sides of the trolley wires and having outwardly-curved, inwardly-projecting, oppositely-disposed lugs in the spaces between the wires.

2. A trolley switch frog composed of spaced plates arranged on opposite sides of the trolley wire and having outwardly curved, inwardly-projecting oppositely-disposed lugs in the spaces between the wires at their points of divergence.

3. A trolley switch frog composed of spaced plates arranged on opposite sides of the trolley wires and having outwardly curved, inwardly-projecting lugs opposite the spaces between the wires, and a hood extending over and connected with said plates.

4. The combination with a trolley switch frog composed of spaced plates arranged on opposite sides of the trolley wires and having outwardly curved, inwardly-projecting lugs opposite the spaces between the wires, of a trolley pole having a wheel mounted thereon with its axle projecting on opposite sides of said pole, and rollers mounted on said projections to engage the under faces of said frog plates and lugs and guide the wheel over the spaces between the wires.

5. The combination with a trolley switch frog composed of spaced plates having curved, inwardly-projecting lugs opposite the spaces between the wires, of a trolley pole having a wheel mounted thereon with its axle projecting on opposite sides of the pole, and rollers mounted on said projections to engage said frog plates and guide the wheel thereover, one of said rollers being tapered toward its outer end to adapt it for short turning.

6. The combination with a trolley switch frog composed of spaced plates having curved, inwardly-projecting lugs opposite the spaces between the wires, of a trolley pole having a wheel mounted thereon with its axle projecting on opposite sides of said pole, and rollers mounted on said projections to engage said frog plates and guide the wheel thereover, one of said rollers being tapered toward its outer end and having its axle or shaft bent upward to bring the face of said tapered roller into the same plane as the face of the other roller.

In testimony whereof I have signed my name to this specification in the presence of two subscribing witnesses.

AUGUSTUS NEUBERT.

Witnesses:
 ROBERT L. EATON,
 LILLIE WALKER.